(12) United States Patent
Martin et al.

(10) Patent No.: US 8,171,952 B2
(45) Date of Patent: May 8, 2012

(54) MULTI-FUNCTION CONTROL VALVE FOR FUEL VAPOR SYSTEM

(75) Inventors: Charles Joseph Martin, Dexter, MI (US); Emil Szlaga, Sterling Heights, MI (US)

(73) Assignee: Eaton Corporation, Cleveland, OH (US)

( * ) Notice: Subject to any disclaimer, the term of this patent is extended or adjusted under 35 U.S.C. 154(b) by 675 days.

(21) Appl. No.: 12/355,186

(22) Filed: Jan. 16, 2009

(65) Prior Publication Data

US 2009/0194170 A1 Aug. 6, 2009

Related U.S. Application Data

(60) Provisional application No. 61/025,418, filed on Feb. 1, 2008.

(51) Int. Cl.
F16K 24/04 (2006.01)
(52) U.S. Cl. .............................. 137/202; 137/43; 137/198
(58) Field of Classification Search .................... 137/43, 137/202, 197, 198, 315.08, 39, 41, 587
See application file for complete search history.

(56) References Cited

U.S. PATENT DOCUMENTS

| | | | |
|---|---|---|---|
| 5,065,782 A * | 11/1991 | Szlaga | 137/39 |
| 5,116,257 A | 5/1992 | Szlaga | |
| 5,603,349 A | 2/1997 | Harris | |
| 5,605,175 A | 2/1997 | Bergsma et al. | |
| 6,199,574 B1 * | 3/2001 | Harris | 137/199 |
| 6,675,779 B2 | 1/2004 | King et al. | |
| 7,163,023 B2 | 1/2007 | Spink et al. | |
| 7,207,347 B2 * | 4/2007 | Olshanetsky et al. | 137/202 |
| 2006/0011234 A1 * | 1/2006 | Spink et al. | 137/202 |
| 2006/0235989 A1 | 10/2006 | Allman et al. | |

FOREIGN PATENT DOCUMENTS

| | | |
|---|---|---|
| EP | 0648637 A1 | 4/1995 |
| WO | 02074571 A2 | 9/2002 |
| WO | 02074571 A3 | 9/2002 |

OTHER PUBLICATIONS

Szlaga, Schematic of Vapor Management Valve Mounted on Fuel Tank, Jan. 23, 1997.
PCT International Search Report for corresponding International Application No. PCT/IB2009/000171, Oct. 21. 2009, 17 pages.

* cited by examiner

*Primary Examiner* — Craig Schneider
*Assistant Examiner* — Craig J Price
(74) *Attorney, Agent, or Firm* — Quinn Law Group, PLLC

(57) ABSTRACT

A fuel vapor vent valve assembly is provided that may include a float valve and an isolation valve arranged in series with each other. Bypass openings in the valve assembly create multiple flow paths as the float valve and the isolation valve respond to changes in fuel tank pressure and fuel level. The control valve assembly may include a housing defining a chamber with a main opening configured to open the chamber to the tank, a vapor vent passage and a first bypass vent opening. A float in the chamber closes the vapor vent passage when fuel in the chamber is at or above a predetermined level. The first bypass vent opening vents the tank to the chamber even when the fuel covers the main opening. A feature on the float provides a metered opening of the vapor vent passage between closed and fully open based on float position.

13 Claims, 5 Drawing Sheets

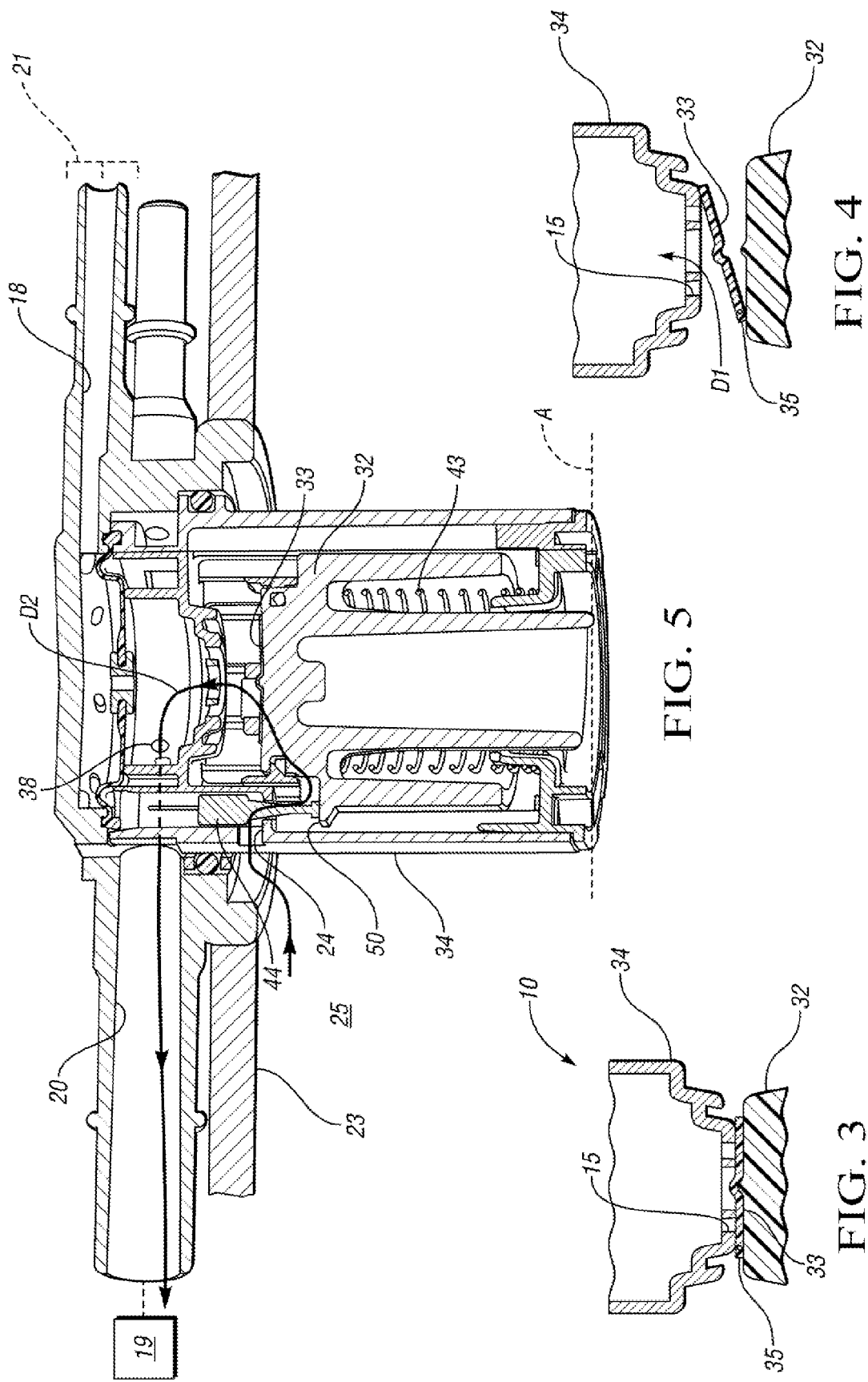

US 8,171,952 B2

MULTI-FUNCTION CONTROL VALVE FOR FUEL VAPOR SYSTEM

CROSS-REFERENCE TO RELATED APPLICATIONS

This application claims the benefit of U.S. Provisional Application 61/025,418, filed Feb. 1, 2008, which is hereby incorporated by reference in its entirety.

TECHNICAL FIELD

The present invention relates to vapor vent valves for fuel tanks and more particularly to a vapor vent valve that is float-operated to control fuel vapor flow from the fuel tank to a storage device, such as a canister.

BACKGROUND OF THE INVENTION

Float-operated vapor vent valves are often used in fuel tanks to control fuel vapor flow from the fuel tank to a vapor storage device, such as a canister filled with granulated carbonaceous material. Vapor may be controlled by attaching vapor management valves, such as a fuel limit vent valve and grade vent valves to the fuel tank. Typically, each valve is installed separately to the fuel tank by forming an opening in the fuel tank, inserting the valve into the opening, and sealing the valve to the opening to prevent leakage of fuel or fuel vapor.

To reduce fuel vapor permeation and the number of openings in the fuel tank, multi-function vapor valve assemblies are known to provide the functions of two or more valves in a common assembly to be attached to the fuel tank through a single access opening, or otherwise mounted in the fuel tank. Such multi-function control valves often include multiple float operated valves that open and close different sized vent ports at different liquid fuel levels in the tank during refueling and in response to fuel sloshing in the tank during vehicle operation.

An additional valve may be included to provide a first orifice that restricts vapor flow from the fuel tank during running conditions. This minimizes abrupt changes in vapor flow and allows more aggressive vapor purging, preventing tail pipe emissions caused by spikes in the fuel vapor level down a purge line. The valve assembly may also include a second orifice that manages vapor recirculation during refueling. The many functions required by the multi-function valve assemblies and the number of valves and flow paths resulting from the functions tend to increase both the size and the complexity of the valve assembly. The way in which the valves communicate with each other and operate relative to different fuel levels and vapor pressures in the fuel tank often requires complicated routing of fuel vapors around and through the various valves to obtain the desired functions.

SUMMARY OF THE INVENTION

There is a desire to simplify the structure of the multi-function control valve assemblies while preserving its functionalities. Accordingly, a fuel vapor vent valve assembly is provided having multiple functions and a simpler configuration than currently known multi-function valve assemblies. One embodiment includes a float valve and an isolation valve arranged in series with each other. Bypass openings in the valve assembly create multiple flow paths as the float valve and the isolation valve respond to changes in fuel tank pressure.

In one embodiment, the assembly includes a float valve in fluid communication with the fuel tank and operable to shut off fill at a selected fill level. The float valve includes a float, and a housing that has both a vapor vent passage and a bypass opening from the tank into the housing that bypasses the main opening(s) (e.g., an opening at the bottom of the housing and, optionally, one or more additional windows in the side of the housing).

An isolation valve is fluidically coupled in series with the float valve upstream of the float valve and is operable to selectively cover and uncover a vapor vent passage in the housing. A vapor recovery passage is fluidically coupled to the float valve and the isolation valve. A recirculation passage is fluidically coupled to the float valve and the isolation valve. The float valve and isolation valve form a first flow path through the bypass opening to the vapor recovery passage to vent the fuel tank after the float closes the vapor vent passage. The float valve and isolation valve also form a second flow path through the vapor vent passage to the recirculation passage during tank fill when the float does not close the vapor vent passage. The float valve and isolation valve also form a third flow path through the vapor vent passage to the vapor recovery passage during vehicle operation when the float does not close the vapor vent passage.

The control valve assembly may be for venting a vapor space of a fuel tank to a recirculation line and to a vapor recovery passage (e.g., a passage leading to a vapor recovery canister), and may include a housing defining a chamber with a main opening configured to open the chamber to the tank when at least a portion of the housing is placed in the fuel tank. The housing further defines a vapor vent passage and a first bypass vent opening. A float is disposed in the chamber and is operable for closing the vapor vent passage when fuel in the chamber is at or above a predetermined level. The first bypass vent opening is operable for venting the tank to the chamber even when the fuel covers the main opening.

A feature on the float is operable to provide a metered opening of the vapor vent passage between closed and fully open based on float position to permit venting therethrough. The feature may be a peel-away feature connected to the float that is urged away from the vapor vent passage by the float when flow through the bypass opening equalizes pressures across the housing, reducing buoyancy of the float, tugging on the feature to induce peel away. Because the feature opens in a gradual, metered fashion, it opens under higher pressures than would a relatively large float. The need for a supplemental float that opens to allow venting after closure of the main opening (e.g., by fuel covering the bottom of the valve housing after filling the tank) is avoided. Therefore, only one float controls venting from the chamber, reducing required components necessary for vent-after-closure functioning.

A cover is secured to the housing and defines a first passage for vapor flow to the recirculation line and a second passage for vapor flow to the canister. An isolation valve, which may be a diaphragm valve, is disposed in series with the float and is configured to control venting from the vapor vent passage to the cover by moving upon a predetermined pressure differential acting on the isolation valve to permit venting from the vapor vent passage to the recirculation line and the second passage. The cover defines a second bypass vent opening configured to permit venting of the vapor vent passage to the second passage. The control valve assembly is configured with an orifice configured to permit venting of the vapor vent passage to the recirculation line regardless of whether the isolation valve has moved.

By creating multiple flow paths and functions all of which are affected by the position of a single float valve, the inventive structure removes the bulk of multiple float valves and simplifies the overall configuration of the multi-function valve while still responding to fuel level and vapor pressure as desired.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic fragmentary cross-sectional view of the valve assembly of FIG. 2 showing a main float in a closed position;

FIG. 4 is a schematic fragmentary cross-sectional view of the valve assembly of FIGS. 2 and 3 showing a peel-away feature in operation enabling metered flow through a vapor vent passage as the main float moves to an open position in a first stage of grade vent flow;

FIG. 5 is a schematic cross-sectional view of the valve assembly of FIGS. 2-4 with the main float in a lower position than in FIG. 4 during a second stage of grade vent flow;

DESCRIPTION OF THE PREFERRED EMBODIMENTS

Figure 1:
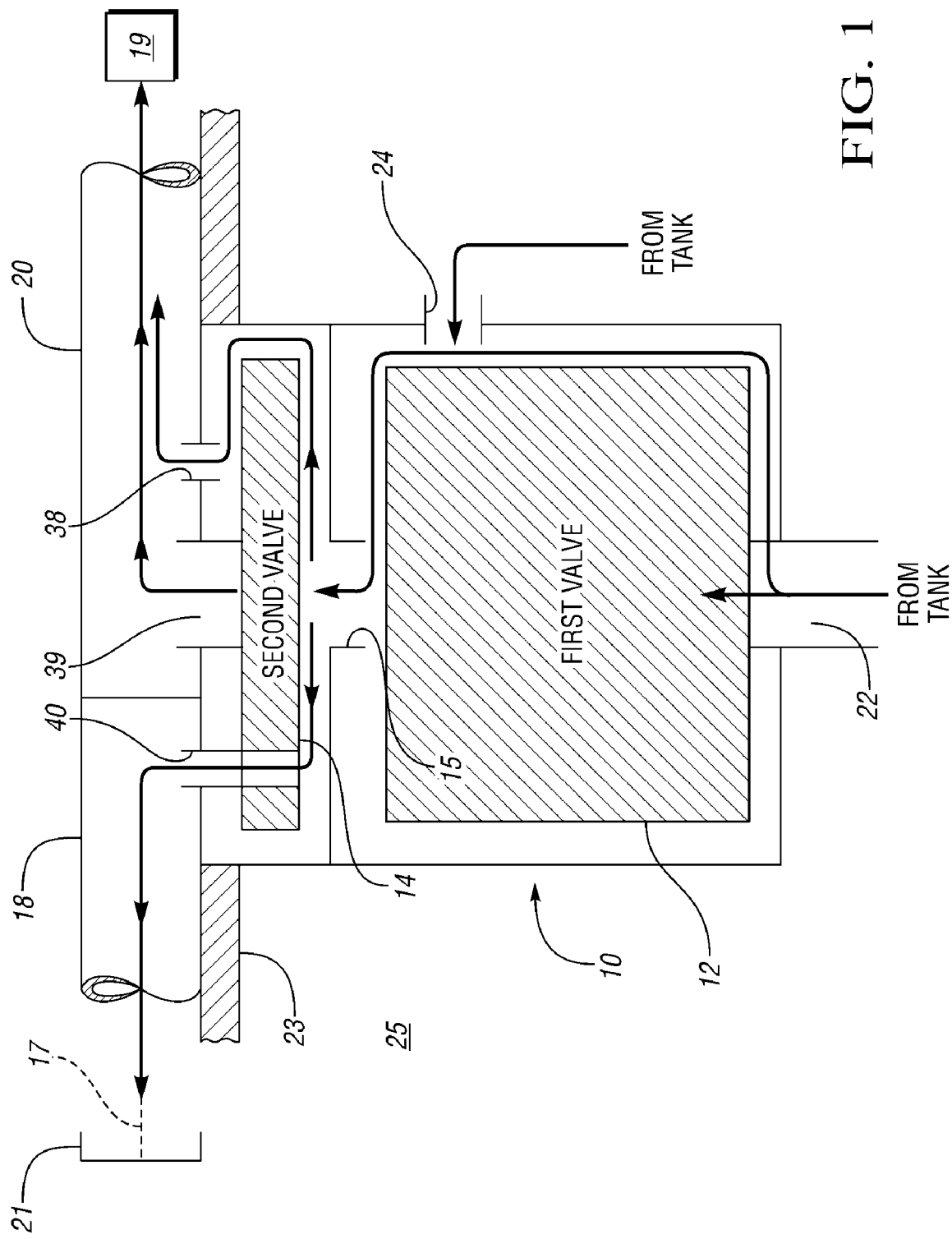
FIG. 1 is a representative partially cross-sectional diagram of one embodiment of a multi-function fuel vapor vent valve assembly.

FIG. 1 is a representative diagram illustrating a multi-function valve assembly 10 according to one embodiment of the invention. The configuration of the valve assembly 10 is shown diagrammatically in order to provide an explanation of the assembly in general terms.

The multi-function valve assembly 10 has a first valve 12 and a second valve 14. The valve assembly 10 also includes a recirculation passage 18 for directing fuel vapor toward a recirculation tube 17, also referred to as a fill tube, and a vapor recovery passage 20 for directing fuel vapor toward a canister 19. A fill cap indicated with reference number 21 is normally secured to the fill tube 17 except during filling of the tank 23, and accordingly is operatively connected to the recirculation passage 18 to close the recirculation passage 18 from the atmosphere except during filling. The first valve 12 has an opening 22, which in this embodiment is a drain opening disposed at a bottom of the first valve 12 and that drains into a fuel tank 23. The first valve 12 also has a bypass opening 24 that is also open to the tank. The opening 22 could alternatively be in the side of the first valve 12, but below the bypass opening 24. The first valve 12 and the second valve 14 are fluidically coupled together in series through a vapor vent passage 15 to control vapor flow from the tank 23 through passages 22 and 24 to either the recirculation passage 18 or the vapor recovery passage 20, depending on the operating state of the valve assembly 10 (e.g., pressure and liquid level, whether a fill cap is on or off, etc.). The second valve 14 will manage flow through a relatively large opening 39 to the vapor recovery passage 20. Regardless of the relationship between the second valve 14 and opening 38, flow is permitted from the vapor vent passage 15 to the vapor recovery passage 20 through a smaller bypass opening 38. An orifice 40 permits flow to the recirculation passage 18 regardless of the relationship between the second valve 14 and opening 38.

FIGS. 2 through 5 are various section views of one embodiment of the invention. These figures show the valve assembly 10 in more detail, and illustrate the different vapor flow paths that are possible in the valve assembly 10 to carry out various functions. In these figures, the first valve 12 is a float valve 30 having a float 32 disposed in a chamber 31 formed by a housing 34. The second valve 14 is an isolation valve, such as a diaphragm valve 36, shown in an open, lifted position consistent with tank filling, and shown in phantom as 36A in a closed, lowered position consistent with vehicle operation when a fill cap 21 is on to close a fill tube 17 fluidly communicating with the recirculation passage 18, whether in run-loss flow or in vent-after-closure flow, as further discussed below. In other embodiments, the valve assembly 10 may be configured so that the second valve 14 moves downward or otherwise, rather than lifts, to an open position during tank filling, and moves to a closed position during vehicle operation when the fill cap 21 closes the fill tube 17. A spring 43 biases the float 32 toward a lifted position, with additional force required to lift the float 32 provided by fuel reaching the float 32. When the float 32 is lowered as in FIG. 2, fuel vapor may pass from the chamber 31 through the vapor vent passage 15, also referred to as a float valve opening, into an upper chamber 29. A peel-away feature 33 is connected to the float 32 at 35 (see FIGS. 3 and 4). The peel-away feature 33 may be a flexible ribbon, or may pivot at 35 (also shown in FIG. 4). A cover 37 is attached to the housing 34 and has the recirculation passage 18 and the vapor recovery passage 20 incorporated therein, as well as an accessory vent passage 46 that may provide vapor flow to an accessory port, such as to a separate rollover valve. The cover 37 is configured such that flow in a passage 39 communicates with upper chamber 29 and also with passage 20. The housing 34 of the float valve 30 has the drain passage 22 at the bottom and the bypass opening 24 on its side. Both the drain passage 22 and the bypass opening 24 open into the fuel tank 23. Alternatively or in addition, one or more windows could be provided in the side of housing 34, above the bottom, to provide flow to the chamber 31, with optional baffles in the flow path to remove entrained liquid.

The cover 37 has a second bypass opening 38 that opens into the vapor recovery passage 20, allowing venting of vapor that has passed through the vapor vent passage 15 and into the upper chamber 29 to the vapor recovery passage 20, even though the diaphragm 36A is not lifted. The valve assembly 10 may have a third bypass opening 40, also referred to as an orifice, which allows vapor to pass into the recirculation passage 18, both when the diaphragm 36 is lifted (as shown in solid in FIG. 2) and when it is not lifted (shown in phantom as 36A). The third bypass opening 40 may be through the diaphragm 36A. Alternatively, the third bypass opening 40 may be elsewhere in the assembly 10, such as in the housing walls and/or cap 37 to allow flow around the diaphragm 36A. Note that the relative sizes of the drain 22 and the bypass openings

24, 38, 40 help control valve operation by controlling the rate at which liquid fuel and/or fuel vapor passes from one region into the next.

Figure 2:
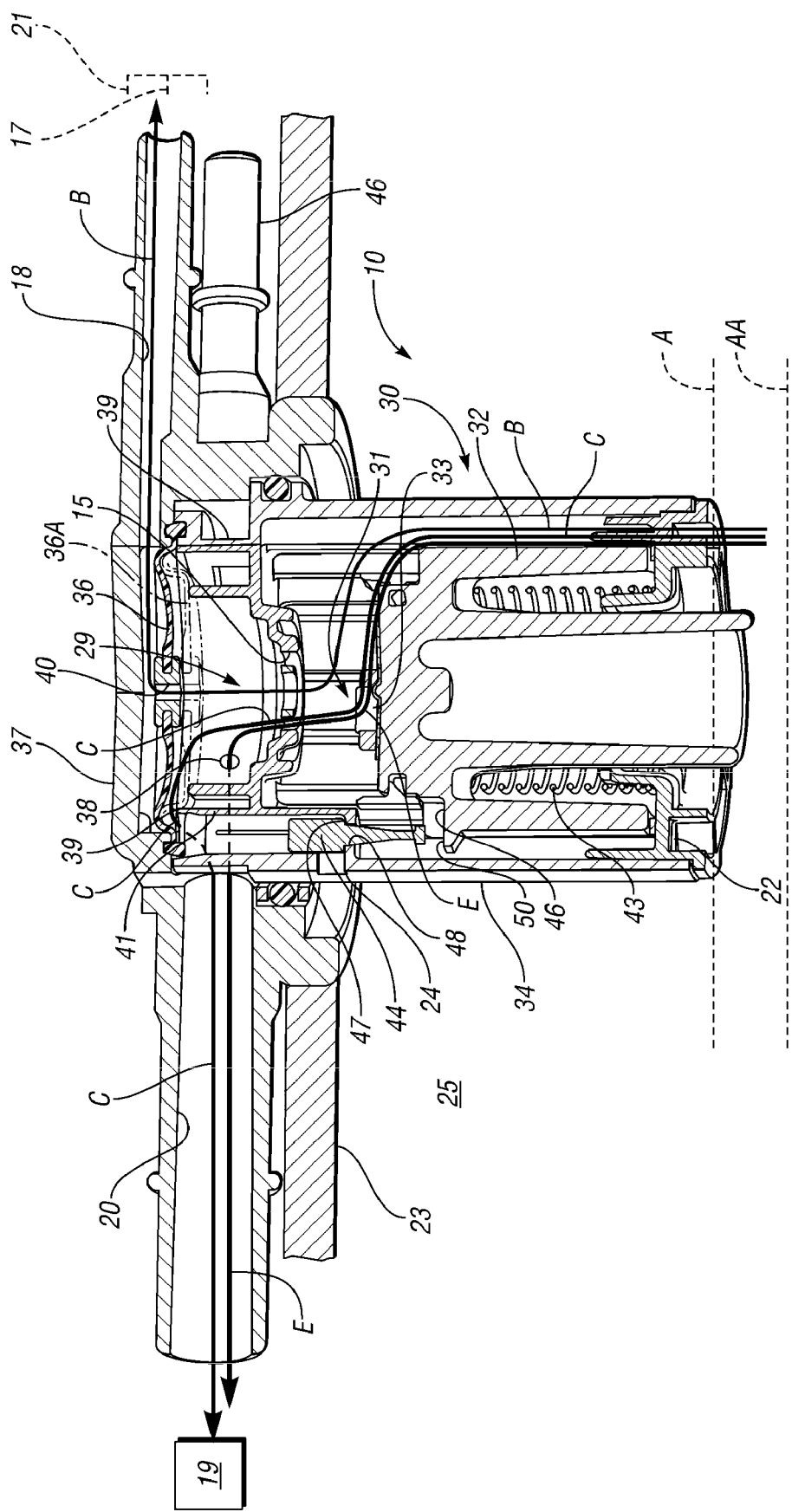
FIG. 2 is a schematic cross-sectional view of another embodiment of a multi-function fuel vapor vent valve assembly indicating a vapor recovery path occurring with an isolation valve lifted and a fill cap off, with a run-loss flow path with the fill cap on, as shown in phantom, and the isolation valve closed, as shown in phantom.

FIG. 3 shows a portion of the assembly 10 during a shut off condition when fuel in the fuel tank 23 has been filled to a predetermined level A indicated in FIGS. 2 and 5 (e.g., a full level). When fuel in the fuel tank 23 reaches the predetermined level, liquid fuel rises through the drain passage 22 even higher than the level A, causing the float 32 to rise and seat against the vapor vent passage 15 to close the float valve 30, as shown in FIG. 3. The liquid within the housing 34 will rise faster than the liquid in the tank once the drain passage 22 of FIG. 2 is closed off because of the differential between the pressure of the vapor space 25 and the pressure within the chambers 29, 31.

Once the float valve 30 closes to induce a nozzle shutoff, the liquid fuel slowly flows out of the drain passage 22 back into the fuel tank 23. This is partially due to the pressure equalization of the tank vapor space 25 and the chamber 31 achieved in a first stage of vent-after-closure flow by flow through the bypass opening 24 and by action of the peel-away feature 33, as described below and shown in FIG. 4, thereby dropping the float 32 and opening the float valve 30 to allow flow through the vent opening 15. However, the liquid fuel level will still be high enough to cover the drain passage 22, preventing vapor flow up through the drain passage 22.

The valve assembly 10 includes an optional secondary closure device, also referred to as a metering valve 44 that blocks vapor flow into the chamber 31 from the tank vapor space 25 through the bypass opening 24 unless the float 32 rises high enough so that shoulder 50 interferes with the metering valve 44, pushing it off of seat 47 to allow bypass vapor flow through opening 48 into the chamber 31.

Recirculation Flow Path and Primary Vapor Recovery Flow Path

Referring to FIG. 2, a recirculation flow path is indicated by arrow B. Recirculation flow path B occurs during filling (i.e., refueling) of the tank 23, with the fill level below the predetermined level A. When the fill cap 21 is off during refueling, the upper surface of the diaphragm 36 is exposed to atmospheric pressure. The higher fuel vapor pressure within the tank vapor space 25 acts on the lower surface of the diaphragm 36. This pressure differential forces the diaphragm 36 upward. A recirculation flow pathway is formed along flow path B, from tank vapor space 25 to chamber 31, then to chamber 29 and through orifice 40 to recirculation passage 18. The vapors are then recirculated into the tank 23 with the entering fuel, thus limiting the amount of fresh air drawn into the tank 23.

At the same time, during tank fill, with the diaphragm 36 lifted, vapor flows along a primary flow path C from the vapor space 25 through opening 22 to chamber 31, through vapor vent passage 15 to chamber 29, underneath the lifted diaphragm 36 to an opening 39 larger than bypass opening 38 and formed within the cover 37 behind the housing 41 of the metered orifice 44 in the view shown, and in direct fluid communication with the vapor recovery passage 20, and then on to canister 19.

Vent After Closure/Grade Vent Flow Paths

At the end of fill, nozzle shutoff occurs, the float 32 closes the vapor vent passage 15, and the cap 21 is placed on the fill pipe, closing off flow out of the vapor recirculation passage 18. Initially, fuel in the tank 23 still covers the bottom of the valve 30 including opening 22, i.e., fuel is at or above the predetermined level A. With the cap 21 on, pressure on either side of the diaphragm 36A equalizes, i.e., the pressure acting on the upper surface of the diaphragm 36A is the same as the pressure acting on the lower surface, and the diaphragm 36A is in the lowered, closed position shown in phantom in FIG. 2. After shutoff, the float 32 is initially in the position shown in FIG. 3, causing the metering valve 44 to rise by interference with a shoulder 50 of the float 32, and allowing vapor from the vapor space 25 to flow through bypass opening 24 and opening 48. With the float 32 in the upward position, flow through bypass opening 24 causes pressures across the housing 34 (between vapor space 35 and chamber 31) to equalize, which in turn causes the fuel inside the housing 34 to drop. The reduction of buoyancy causes the float 32 to tug on the peel-away feature 33, inducing peel-away and thereby allowing the vapor into the upper chamber 29 and out through the second bypass opening 38 to the vapor recovery passage 20, establishing a vent-after-closure flow path D1, shown partially in FIG. 4. This vent-after-closure path D1 may also be established when a vehicle with the tank 23 is parked on a grade, so that fuel covers the bottom of the housing 34 (i.e., is at level A or higher).

At another fuel level still at or above predetermined level A, the float 32 drops to a level in which the peel-away feature 33 is not in contact with the housing 34 at opening 15, as shown in FIG. 5, which is taken at a different cross-section than FIGS. 3 and 4. The metering valve 44 only partially blocks bypass opening 24. Vapor flows from vapor space 25 through bypass opening 24 and opening 48 to chambers 31 and 29, and out through orifice 38 to vapor recovery passage 20 and canister 19. Flow path D2 may be referred to as a second grade vent flow path or a second vent-after-closure flow path, occurring after the peel-away feature 33 has completely peeled away from the opening 15. Flow path D2 may occur when the tank 23 is on a grade, or anytime the fuel level covers the bottom opening 22 and the fill cap 21 is on. The first grade path D1 is the same as second grade path D2, except that the opening 15 is only partly uncovered by the peel-away feature 33 during venting along flow path D1.

The peel-away feature 33 permits vent-after-closure venting at much higher tank pressures. With the lever affect of the peel-away feature 33, a higher tank pressure can cause peel-away of the float 32 but could not move a like-size float without a peel-away feature away from opening 15. Those skilled in the art readily understand the function and operation of a peel-away feature. Other types of float-mounted flow metering features may be used to establish vent-after-closure venting at the same higher pressure and more gradual opening.

Run/Loss Flow Path

Referring again to FIG. 2, during vehicle operation with cap 21 on, as fuel level in the tank 23 lowers, the bottom of the housing 34 is eventually uncovered, i.e., fuel falls below predetermined level A to level AA. The float 32 is lowered to the position of FIG. 2, and the metering valve 44 thereby closes off the bypass opening 24. The diaphragm is in the lowered position 36A. Vapor flows along run/loss flow path E from the tank vapor space 25 through the opening 22 in the bottom of the housing 34, and up through vapor vent opening 15. With the diaphragm in the lowered position 36A, the vapor can only exit through the bypass opening 38 to the vapor recovery passage 20 and on to the canister 19.

Second Embodiment with Vapor Discriminating Feature

Figure 6:
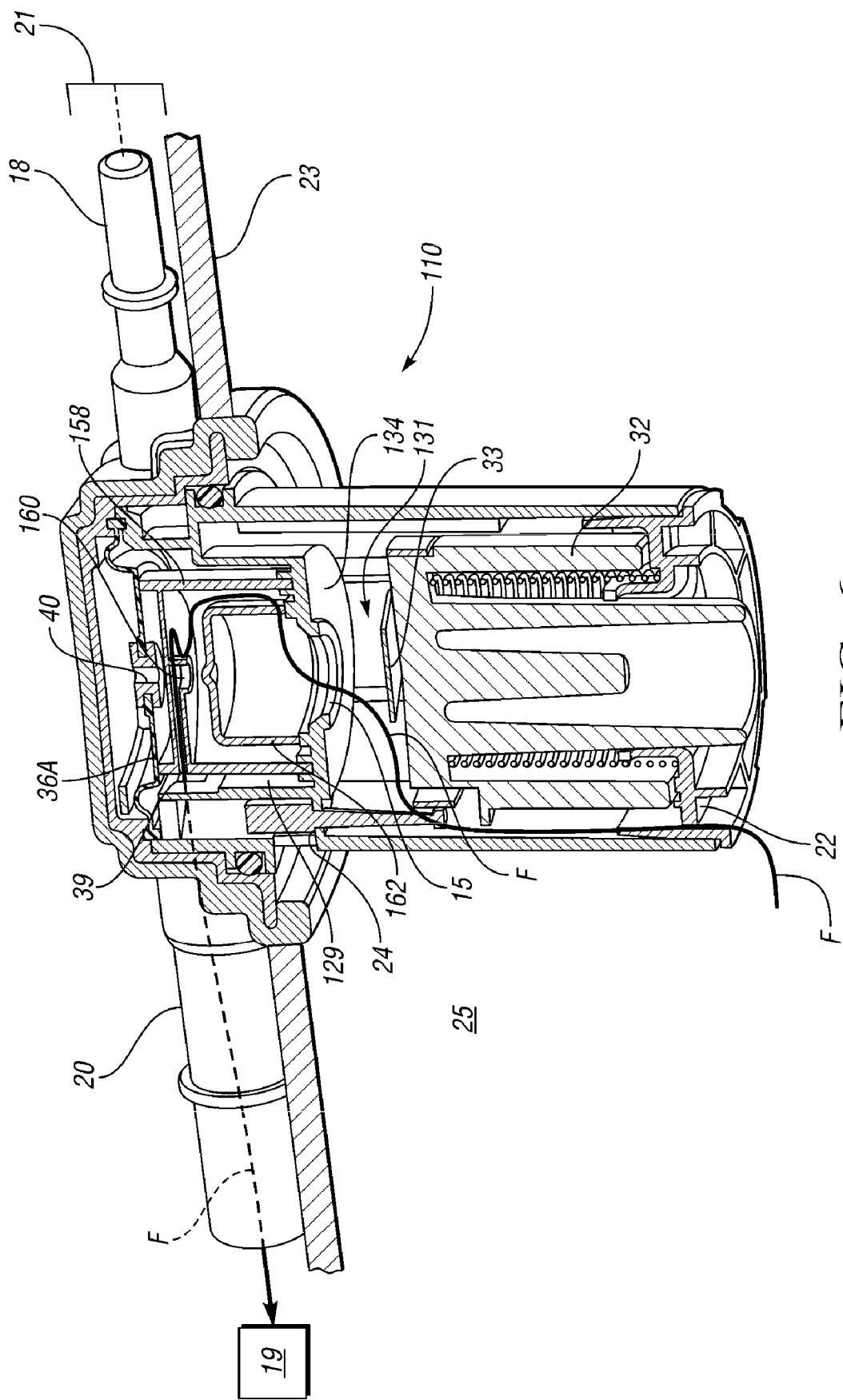
FIG. 6 is a schematic cross-sectional illustration of another embodiment of a multi-function fuel vapor vent valve having a vapor discriminating valve during recirculation flow and during run/loss flow (shown in phantom)
Figure 7:
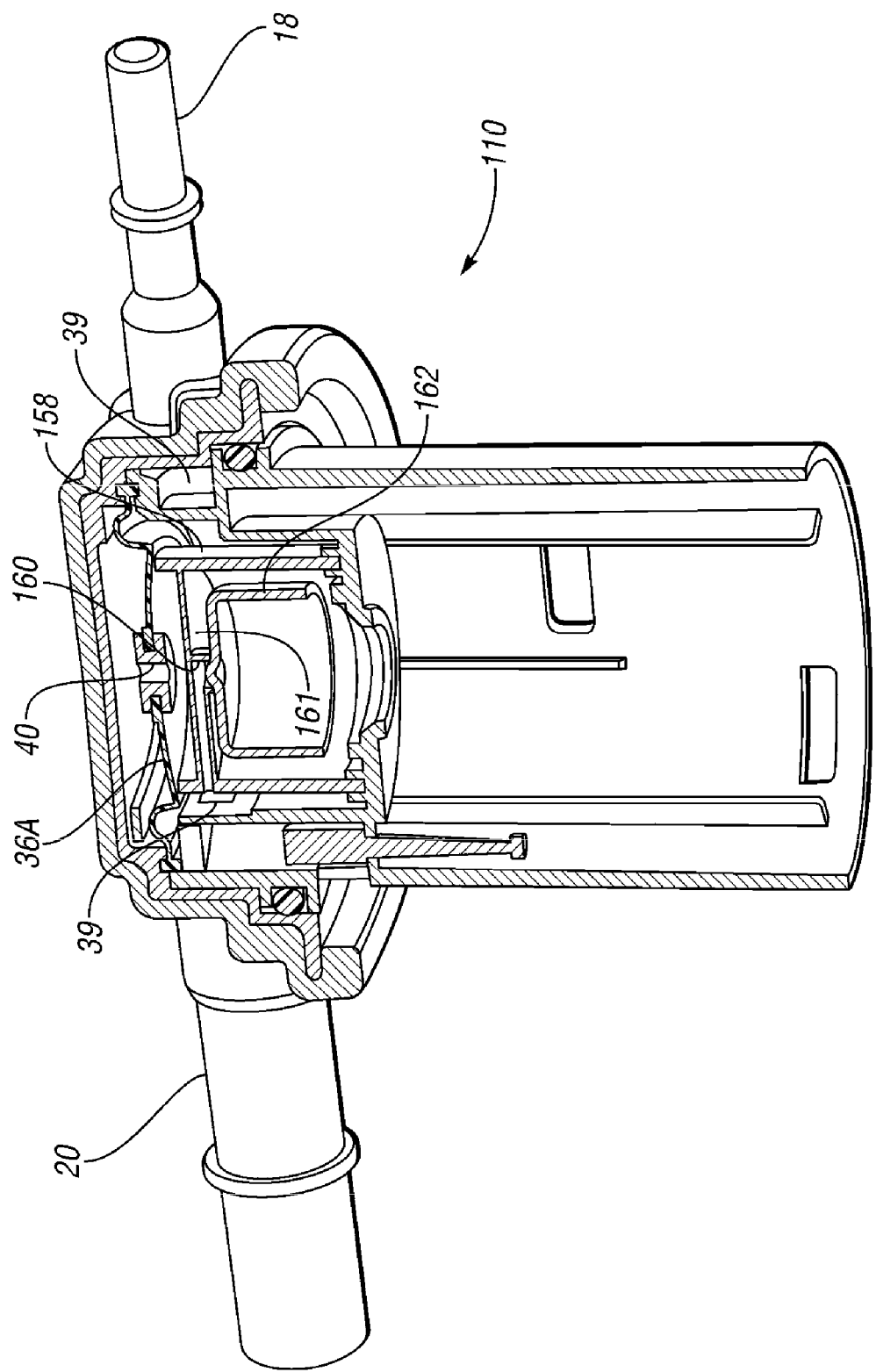
FIG. 7 is a schematic cross-sectional illustration of the valve assembly of FIG. 6, with the main float removed, illustrating the vapor discriminating valve providing secondary protection from liquid entering the vapor vent passages when at a grade angle or under a failure of the main float.

Referring to FIGS. 6 and 7, another embodiment of a multi-function control valve assembly 110 is shown (only partially shown in FIG. 7). The valve assembly 110 has many of the same components as valve 10, and such are numbered in like manner and perform according to the functions described with respect to valve assembly 10. In particular, a partial tube 158 with an orifice 160 is added between the diaphragm 36A and the opening 15. An additional vapor-discriminating float 162 rests on the housing 134 and is added within tube 158 and supported within the housing 134 above the vapor vent opening 15. During normal run/loss flow, the discriminating float 162 rests on the housing 134 and does not block flow through the orifice 160. Flow from the vapor space 25 thereby proceeds along flow path F (also referred to herein as the third flow path) drain opening 22, vapor vent passage 15, opening 160 and opening 39 in the housing 134 to vapor recovery passage 20. When the diaphragm 36A is in the lowered position, all venting to passage 20 is through the opening 160. The tube 158 has an opening 161 (best shown in FIG. 7) larger than opening 160 that is in communication with the lower surface of the diaphragm 36A and the orifice 40. Thus, the opening 160 does not affect the recirculation flow to passage 18, (also referred to as the second flow path) flow to the vapor recovery passage 20 when the diaphragm is lifted to position 36 (shown with respect to the embodiment of FIG. 2). Should liquid fuel rise above the chamber 131 into chamber 129, the liquid discriminating valve 162 functions as a cup to cause the liquid to drain back down into chamber 131. If liquid fills chamber 129, the valve 162 will close off orifice 160, as shown in FIG. 7, ensuring that no liquid can make it to the vapor recovery passage 20.

Thus, the first grade vent flow path (also referred to herein as the first flow path) occurs with fuel level above the opening 22 and fill cap 21 on, during peel-away of feature 33 from vapor space 25, through bypass opening 24, through vent passage 15, around float 162 and through opening 160 to passage 20. The second grade vent flow path occurs after the float 32 has dropped and the peel-away feature 33 has completed the peel to open vent passage 15, and is the same as the first grade vent flow path, with the vent passage 15 completely opened. The recirculation flow path occurring with the fuel level below opening 22 and fill cap on is through opening 22 and chamber 131 through vent passage 15, through opening 161 of FIG. 7 and orifice 40 to passage 18. Primary flow to the canister 19 during filling with the fill cap 21 off and fuel level below the opening 22 is along the same path except under the lifted diaphragm 36 (shown with respect to the embodiment of FIG. 2) to opening 39 and on to passage 20 (also referred to herein as the fourth flow path), instead of through orifice 40. A run-loss flow path occurring with liquid level below the opening 22 and the fill cap 21 on is through opening 22, chamber 131, vapor vent passage 15, opening 160 and passage 20. Thus, the diaphragm valve 36A moves due to a pressure differential to uncover the vent opening 39 in the housing 134 to partially form a fourth flow path through the vapor vent passage 15 and the vent opening 39 in the housing. The first and the third flow paths are formed when the diaphragm valve 36A covers the vent opening 39 in the housing 134.

The multi-function valve assemblies 10, 110 therefore create multiple flow pathways to handle vapor during multiple operating conditions without requiring more than one float valve to control venting from chamber 31 to the upper chamber 29, 129. The metered opening feature, such as peel-away feature 33, enables the single float 32 to be opened at relatively high pressures to accommodate vent-after-closure/grade vent flow. This reduces the size and complexity of the assembly without sacrificing functionality.

While the best modes for carrying out the invention have been described in detail, those familiar with the art to which this invention relates will recognize various alternative designs and embodiments for practicing the invention within the scope of the appended claims.

The invention claimed is:

1. A control valve assembly for venting a vapor space of a fuel tank, comprising:
   a housing defining a chamber with a main opening configured to open the chamber to the tank when at least a portion of the housing is placed in the fuel tank, and further defining a vapor vent passage and a first bypass vent opening;
   a main float disposed in the chamber and operable for closing the vapor vent passage when fuel in the chamber is at or above a predetermined level; wherein the first bypass vent opening is operable for venting the tank to the chamber even when the fuel covers the main opening;
   a feature on the main float operable to provide a metered opening of the vapor vent passage between closed and fully open based on a main float position to permit venting therethrough;
   a cover secured to the housing and defining a first passage for vapor flow to a recirculation line and a second passage for vapor recovery;
   a second float in series with the main float between the main float and the first and second passages and configured to discriminate liquid from vapor to prevent liquid flow into the first and second passages; and
   an isolation valve disposed in series with the main float and configured to control venting from the vapor vent passage to the cover by moving upon a predetermined pressure differential acting on the isolation valve to permit venting from the vapor vent passage to the recirculation line and the second passage when the isolation valve moves; wherein the cover defines a second bypass vent opening configured to permit venting of the vapor vent passage to the second passage; and wherein the control valve assembly is configured with an orifice configured to permit venting of the vapor vent passage to the recirculation line regardless of whether the isolation valve moves.

2. The valve assembly of claim 1, wherein the recirculation line is in fluid communication with a fill tube that is selectively closable with a fill cap;
   wherein the tank vents through the bypass passage and the vapor vent passage by operation of the feature when the fill cap closes the fill tube and fuel is at or above the predetermined fuel level and the main float is covering the vapor vent passage; and wherein the tank vents through the bypass passage and the vapor vent passage when the fill cap closes the fill tube and fuel is at or above the predetermined fuel level and the main float is not covering the vapor vent passage.

3. The valve assembly of claim 1, further comprising:
   a secondary closure device movable via the main float to control venting of the vapor space through the bypass vent opening.

4. The valve assembly of claim 1, wherein the cover further defines an accessory vent passage for venting the vapor space to an accessory port; wherein the accessory vent passage is in fluid communication with the first passage.

5. The control valve assembly of claim 1, wherein the isolation valve is a diaphragm valve.

6. The control valve assembly of claim 1, wherein the feature is a peel-away feature pivotably connected to the main float.

7. A control valve assembly for a fuel tank, comprising:
   a float valve in fluid communication with the fuel tank and operable to shut off fill at a selected fuel fill level, the float valve including a float and a housing having a main opening to the tank, a vapor vent passage and a bypass opening from the tank into the housing that bypasses the main opening;

an isolation valve fluidically coupled in series with the float valve upstream of the float valve and operable to selectively cover and uncover a vent opening in the housing;

a vapor recovery passage fluidically coupled to the float valve and the isolation valve; and a recirculation passage fluidically coupled to the float valve and the isolation valve;

wherein the float valve and isolation valve form:
- a first flow path through the bypass opening to the vapor recovery passage to vent the fuel tank after fuel closes the main opening;
- a second flow path through the vapor vent passage to the recirculation passage during tank fill when the float does not close the vapor vent passage;
- a third flow path through the vapor vent passage to the vapor recovery passage during vehicle operation when the float does not close the vapor vent passage; and
- wherein the first flow path and the third flow path are through an additional bypass opening in the housing that bypasses the isolation valve; and wherein the second flow path is through an orifice in the control valve assembly.

8. The control valve assembly of claim 7, wherein the isolation valve is a diaphragm valve.

9. The control valve assembly of claim 7, wherein the isolation valve moves due to a pressure differential to uncover the vent opening in the housing to partially form a fourth flow path through the vapor vent passage and the vent opening in the housing; and wherein the first and the third flow paths are formed when the isolation valve covers the vent opening in the housing.

10. The control valve assembly of claim 7, wherein the first flow path is a vent flow path, the second flow path is a recirculation flow path, and the third flow path is a run/loss flow path.

11. The control valve assembly of claim 7, wherein the float is a main float and further comprising:
a second float in series with the main float and configured to discriminate liquid from vapor to prevent liquid flow into the vapor recovery passage.

12. The control valve assembly of claim 7, further comprising:
a feature on the float operable to provide a metered opening of the vapor vent passage between closed and fully open based on float position to permit venting therethrough.

13. The control valve assembly of claim 12, wherein the feature is a peel-away feature pivotably connected to the float.

* * * * *